United States Patent
Heller et al.

(10) Patent No.: US 7,958,441 B2
(45) Date of Patent: Jun. 7, 2011

(54) MEDIA MANAGEMENT FOR GROUPS OF MEDIA ITEMS

(75) Inventors: David Heller, San Jose, CA (US); Jeffrey L. Robbin, Los Altos, CA (US); Steven P. Jobs, Palo Alto, CA (US); Timothy Wasko, High River (CA); Jeff Miller, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 488 days.

(21) Appl. No.: 11/097,591

(22) Filed: Apr. 1, 2005

(65) Prior Publication Data

US 2006/0156236 A1    Jul. 13, 2006

Related U.S. Application Data

(60) Provisional application No. 60/642,334, filed on Jan. 7, 2005.

(51) Int. Cl.
*G06N 3/00*    (2006.01)

(52) U.S. Cl. ........................................ 715/201

(58) Field of Classification Search .................. 715/513, 715/517, 523, 530, 234, 243, 254, 255, 201
See application file for complete search history.

(56) References Cited

U.S. PATENT DOCUMENTS

| | | |
|---|---|---|
| 3,990,710 A | 11/1976 | Hughes |
| 4,528,643 A | 7/1985 | Freeny, Jr. |
| 4,851,931 A | 7/1989 | Parker et al. |
| 5,168,481 A | 12/1992 | Culbertson et al. |
| 5,181,107 A | 1/1993 | Rhoades |
| 5,191,573 A | 3/1993 | Hair |
| 5,341,350 A | 8/1994 | Frank et al. |
| 5,355,302 A | 10/1994 | Martin et al. |
| 5,418,713 A | 5/1995 | Allen |
| 5,428,735 A | 6/1995 | Kahl et al. |
| 5,481,509 A | 1/1996 | Knowles |
| 5,504,852 A | 4/1996 | Thompson-Rohrlich |

(Continued)

FOREIGN PATENT DOCUMENTS

EP    0 917 077    5/1999

(Continued)

OTHER PUBLICATIONS

Windows XP Service Pack 2, Figures 1-2 and "How to obtain the latest Windows XP service pack," Aug. 25, 2004.*

(Continued)

*Primary Examiner* — Kyle R Stork

(57) ABSTRACT

Improved techniques to utilize and manage a group of media items (or media assets) on a computing device are disclosed. The group of media items can be utilized and managed at a host computer for the host computer as well as a media device (e.g., media player) that can couple to the host computer. One popular example of a group of media items is know as a playlist, which can pertain to a group of audio tracks. One aspect pertains to a graphical user interface that enables a user to trade-off storage capacity of a media device between media asset storage and data storage. Another aspect pertains to a graphical user interface that assists a user with selecting media items to fill a group of media items. Still another aspect pertains to providing a persistent media device playlist at a host computer. Yet still another aspect pertains to imposing capacity limits to a playlist, such as a media device playlist.

28 Claims, 11 Drawing Sheets

U.S. PATENT DOCUMENTS

| | | | |
|---|---|---|---|
| 5,559,945 A | 9/1996 | Beaudet et al. |
| 5,561,604 A | 10/1996 | Buckley et al. |
| 5,566,353 A | 10/1996 | Cho et al. |
| 5,583,993 A | 12/1996 | Foster et al. |
| 5,587,404 A | 12/1996 | Kroner et al. |
| 5,616,876 A | 4/1997 | Cluts |
| 5,633,839 A | 5/1997 | Alexander et al. |
| 5,640,566 A | 6/1997 | Victor et al. |
| 5,666,530 A | 9/1997 | Clark et al. |
| 5,710,922 A | 1/1998 | Alley et al. |
| 5,714,971 A | 2/1998 | Shalit et al. |
| 5,721,949 A | 2/1998 | Smith et al. |
| 5,726,909 A | 3/1998 | Krikorian |
| 5,727,202 A | 3/1998 | Kucala |
| 5,734,823 A | 3/1998 | Saigh et al. |
| 5,739,451 A | 4/1998 | Winksy et al. |
| 5,740,134 A | 4/1998 | Peterson |
| 5,819,160 A | 10/1998 | Foladare et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,875,110 A | 2/1999 | Jacobs |
| 5,897,642 A | 4/1999 | Capossela et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,926,819 A | 7/1999 | Doo et al. |
| 5,963,916 A | 10/1999 | Kaplan |
| 5,969,283 A | 10/1999 | Looney et al. |
| 5,983,069 A | 11/1999 | Cho et al. |
| 5,995,098 A | 11/1999 | Okada et al. |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,052,797 A | 4/2000 | Ofek et al. |
| 6,061,306 A | 5/2000 | Buchheim |
| 6,125,369 A | 9/2000 | Wu et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 | 6/2001 | Dwek |
| 6,255,961 B1 | 7/2001 | Van Rzin et al. |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,338,044 B1 | 1/2002 | Cook et al. |
| 6,341,316 B1 | 1/2002 | Kloba et al. |
| 6,356,971 B1 | 3/2002 | Katz et al. |
| 6,380,947 B1 | 4/2002 | Stead |
| 6,389,467 B1 | 5/2002 | Eyal |
| 6,407,750 B1 | 6/2002 | Gioscia et al. |
| 6,434,680 B2 | 8/2002 | Belknap et al. |
| 6,446,080 B1 | 9/2002 | Van Ryzin et al. |
| 6,452,609 B1 | 9/2002 | Katinsky et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Carini et al. |
| 6,664,981 B2 | 12/2003 | Ashe et al. |
| 6,665,803 B2 | 12/2003 | Lunsford et al. |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1 | 7/2004 | Hempleman et al. |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,874,037 B1 | 3/2005 | Abram et al. |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,978,127 B1 | 12/2005 | Bulthuis et al. |
| 6,987,221 B2 | 1/2006 | Platt |
| 7,003,495 B1 | 2/2006 | Burger et al. |
| 7,043,477 B2 | 5/2006 | Mercer et al. |
| 7,055,165 B2 | 5/2006 | Connelly |
| 7,111,009 B1 | 9/2006 | Gupta et al. |
| 7,117,516 B2 | 10/2006 | Khoo et al. |
| 7,126,770 B1 | 10/2006 | Arai et al. |
| 7,209,633 B1 | 4/2007 | Novak et al. |
| 7,228,298 B1 | 6/2007 | Raines |
| 7,272,385 B2 | 9/2007 | Mirouze et al. |
| 7,478,323 B2 | 1/2009 | Dowdy |
| 7,502,626 B1 | 3/2009 | Lemilainen |
| 2001/0004310 A1 | 6/2001 | Kono |
| 2001/0011308 A1 | 8/2001 | Clark et al. |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan et al. |
| 2002/0013784 A1 | 1/2002 | Swanson |
| 2002/0015161 A1 | 2/2002 | Haneda et al. |
| 2002/0016968 A1 | 2/2002 | Nathan et al. |
| 2002/0046315 A1 | 4/2002 | Miller et al. |
| 2002/0055934 A1 | 5/2002 | Lipscomb et al. |
| 2002/0073167 A1 | 6/2002 | Powell et al. |
| 2002/0080180 A1 | 6/2002 | Mander et al. |
| 2002/0116082 A1 | 8/2002 | Gudorf |
| 2002/0118300 A1 | 8/2002 | Middleton et al. |
| 2002/0133515 A1 | 9/2002 | Kagle et al. |
| 2002/0138606 A1 | 9/2002 | Robison |
| 2002/0152278 A1 | 10/2002 | Pontenzone et al. |
| 2002/0161865 A1 | 10/2002 | Nguyen |
| 2002/0174269 A1 | 11/2002 | Spurgat et al. |
| 2002/0194195 A1 | 12/2002 | Fenton et al. |
| 2002/0194309 A1 | 12/2002 | Carter et al. |
| 2003/0013493 A1 | 1/2003 | Irimajiri et al. |
| 2003/0014767 A1 | 1/2003 | Stumphauzer |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0055723 A1 | 3/2003 | English |
| 2003/0074457 A1 | 4/2003 | Kluth |
| 2003/0079038 A1 | 4/2003 | Robbin et al. |
| 2003/0093340 A1 | 5/2003 | Krystek et al. |
| 2003/0098893 A1 | 5/2003 | Makinen |
| 2003/0112279 A1 | 6/2003 | Irimajiri |
| 2003/0149628 A1 | 8/2003 | Abbosh et al. |
| 2003/0167318 A1 | 9/2003 | Robbin et al. |
| 2003/0182315 A1 | 9/2003 | Plastina et al. |
| 2003/0191756 A1 | 10/2003 | Oh |
| 2003/0206203 A1 | 11/2003 | Ly |
| 2003/0210821 A1 | 11/2003 | Yogeshwar et al. |
| 2003/0221541 A1 | 12/2003 | Platt |
| 2004/0001395 A1 | 1/2004 | Keller et al. |
| 2004/0001396 A1 | 1/2004 | Keller et al. |
| 2004/0017997 A1 | 1/2004 | Cowgill |
| 2004/0027930 A1 | 2/2004 | Kudo |
| 2004/0055446 A1 | 3/2004 | Robbin et al. |
| 2004/0076086 A1 | 4/2004 | Keller |
| 2004/0083480 A1 | 4/2004 | Dodge |
| 2004/0093274 A1 | 5/2004 | Vanska et al. |
| 2004/0103102 A1 | 5/2004 | Nelson |
| 2004/0113915 A1 | 6/2004 | Ohtsuki et al. |
| 2004/0123242 A1 | 6/2004 | McKibben |
| 2004/0123725 A1 | 7/2004 | Kim |
| 2004/0128277 A1 | 7/2004 | Mander et al. |
| 2004/0139180 A1 | 7/2004 | White et al. |

| | | | |
|---|---|---|---|
| 2004/0148358 | A1 | 7/2004 | Singh et al. |
| 2004/0205028 | A1 | 10/2004 | Verosub et al. |
| 2004/0225762 | A1 | 11/2004 | Poo |
| 2004/0261064 | A1 | 12/2004 | Goldstein et al. |
| 2005/0055718 | A1 | 3/2005 | Stone |
| 2005/0060264 | A1 | 3/2005 | Schrock et al. |
| 2005/0080915 | A1 | 4/2005 | Shoemaker |
| 2005/0149392 | A1 | 7/2005 | Gold et al. |
| 2005/0235015 | A1 | 10/2005 | Abanami et al. |
| 2005/0240494 | A1 | 10/2005 | Cue et al. |
| 2005/0240661 | A1 | 10/2005 | Heller et al. |
| 2005/0249080 | A1* | 11/2005 | Foote et al. ............. 369/59.1 |
| 2005/0262528 | A1 | 11/2005 | Herley |
| 2005/0267803 | A1 | 12/2005 | Patel et al. |
| 2005/0278377 | A1 | 12/2005 | Mirrashidi et al. |
| 2006/0163358 | A1* | 7/2006 | Biderman ............. 235/472.01 |
| 2006/0168340 | A1 | 7/2006 | Heller et al. |
| 2006/0247980 | A1 | 11/2006 | Mirrashidi et al. |
| 2008/0256378 | A1 | 10/2008 | Guillorit |
| 2009/0063496 | A1 | 3/2009 | Cunningham et al. |
| 2009/0063543 | A1 | 3/2009 | Martin et al. |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| WO | WO 01/33569 | 6/1995 |
| WO | WO 95/16950 | 6/1995 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 2004-004338 | 1/2004 |
| WO | WO 2004/084413 | 9/2004 |
| WO | 2005073856 A2 | 8/2005 |

OTHER PUBLICATIONS

De Herrera, Chris, "Microsoft ActiveSync 3.1," Version 1.02, Oct. 13, 2000.
IEEE 1394—Wikipedia, 1995, http://www.wikipedia.org/wiki/Firewire.
Miniman, "Applian Software's Replay Radio and Player v1.02," Product review, pocketnow.com, http://www.pocketnow.com/reviews/replay/replay.htm, Jul. 31, 2001.
Personal Jukebox (PJB), "Systems Research Center and PAAD," Compaq Computer Corp., Oct. 13, 2000, http://research.compaq.com/SRC/pjb/.
Compaq, "Personal Jukebox," Jan. 24, 2001, http://research.compaq.com/SRC/pjb/.
Steinberg, "Sonicblue Rio Car," Product Review, Dec. 12, 2000, http://electronics.cnet.com/electronics/0-6342420-1304-4098389.html.
Andrew Birrell, "Personal Jukebox (PJB)," Oct. 13, 2000, http://birrell.org/andrew/talks/pjb-overview.ppt.
Travis Butler, "Portable MP3: The Nomad Jukebox," Jan. 8, 2001, http://db.tidbits.com/getbits.acgi?tbart=06261.
Travis Butler, "Archos Jukebox 6000 Challenges Nomad Jukebox," Aug. 13, 2001, http://db.tidbits.com/getbits.acgi?tbart=06521.
Adam C. Engst, "SoundJam Keeps on Jammin'," Jun. 19, 2000, http://db.tidbits.com/getbits.acgi?tbart=05988.
Musicmatch, "Musicmatch and Xing Technology Introduce Musicmatch Jukebox," May 18, 1998, http://www.musicmatch.com/info/company/press/releases/?year=1998&release=2.
"Nomad Jukebox," User Guide, Creative Technology Ltd., Version 1, Aug. 2000.
"Apple's iPod Available in Stores Tomorrow," Press Release, Apple Computer, Inc., Nov. 9, 2001.
"Apple Introduces iTunes—World's Best and Easiest To Use Jukebox Software," Macworld Expo, San Francisco, Jan. 9, 2001.
iTunes, Playlist Related Help Screens, iTunes v1.0, Apple Computer, Inc., Jan. 2001.
"Apple Announces iTunes 2," Press Release, Apple Computer, Inc., Oct. 23, 2001.
Specification Sheet, iTunes 2, Apple Computer, Inc., Oct. 31, 2001.
iTunes 2, Playlist Related Help Screens, iTunes v2.0, Apple Computer, Inc., Oct. 23, 2001.
SoundJam MP Plus, Representative Screens, published by Casady & Greene, Inc., Salinas, CA, 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs.
International Search Report dated Jul. 9, 2003, from International Application No. PCT/US03/21534.
Torrone, Phillip, How-To: Getting Podcasts on a Portable Media Center (and other Windows Media Devices, Oct. 2004.
"Hewlett Packard Jornada 525 Color Pocket PC," downloaded Jan. 25, 2002, http://www.pc4d.com/electronics/products/56/jornada_525_color_pocket_pc.shtml.
"Replay Gain—A proposed Standard," Oct. 7, 2001, from http://replaygain.hydrogenaudio.org/index.html and http://replaygain.hydrogenaudio.org/outline.html.
"About MusicMatch Jukebox," MusicMatch Jukebox v4 Help, 1999, pp. 1-4.
"iTunes Celebrates Its First Anniversary; Over 70 Million Songs Purchased," Apr. 28, 2004, http://www.apple.com/pr/library/2004/apr/28itunes.html.
"Rio Portable Music Player," Independent Web Review, downloaded Jan. 25, 2002, http://www.webreviews.com/9901/rio.html.
Breen, Christopher, "iMixing it Up: Sharing Your Sounds," Sep. 17, 2004, http://playlistmag.com/help/2004/09/imixhowto/index.php.
Bridgman, "Windows XP Expert Zone Community Columist", Using Windows Mobil-based Portable Media Centers and Windows Media Player 10, Aug. 25, 2004, 1-11.
Compaq Computer Corp., copyright 1991, Personal Jukebox User Manual, pp. 1-29.
Fleishman, Glenn, "Handheld iPod joins MP3 band a bit late, but is standout player," Nov. 6, 2001, http://seattletimes.nwsource.com/html/businesstechnology/134361811_ptmacc040.html.
Handbook for PalmTM™ m500 Series Handhelds, User Manual, copyright 1998-2001.
iTunes, Digital Music for your Mac, Apple Computer, Inc., downloaded Oct. 22, 2001, http://www.apple.com/itunes/.
Kawamoto et al., "On 1$^{st}$ Birthday, iTunes Unwraps New Features," Apr. 28, 2004, http://news.com.com/On+1st+birthday,+iTunes+unwraps+new+features/2100-1027_3-5201598.html.
Lindauer, Andy, "What's in your Pocket?," Edgereview, downloaded Jan. 25, 2002, http://www.edgereview.com/print.cfm?Type=aag&ID=286.
Lyra, Personal Digital Player, RCA, Product Box, (2003).
RCA Lyra User's Guide, RD2201/2202/2204, www.lyrazone.com, (1999) pp. 1-37.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
TuneBase 100 User Guide, A CD Library Management System, Escient, Inc. copyright 1999.
TuneBase Pro Mk-II User's Guide, Escient, Inc. (1999).
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.

Zheng et al., "MobiGATE: a mobile gateway proxy for the active deployment of transport entities," Proceedings of the 2004 International Conference on Parallel Processing, Piscataway, NJ, Aug. 15, 2004.

PBS Local Insertion Server Instruction Manual, Microvision, Inc., pp. 1-71, Jun. 19, 1996.

Wave Station Digital Audio Automation System, Instruction & Operations Manual Broadcast Software International, pp. 1-113, Feb. 4, 1997.

Nielsen et al., "Comparative Design Review: An Exercise in Parallel Design", INTERCHI '93, pp. 414-417 Apr. 24-29, 1993.

Lowery Daryl, "Random-Access Digital Audio—Recording Systems", pp. 68-71, Jun. 1992.

Sadie Master System, Product Brochure, Studio audio Digital Equipment Inc., 2 pgs, Apr. 3, 2009.

RCS Works-Cart Wall User's Guide and Reference Manual, pp. 1-83, Feb. 7, 1993.

"Digital Audio Just Got Easier!", CartWorks Digital Audio Systems, dbm Systems, Inc, Jun. 26, 1996.

"CartWorks File Utilities User's Manual", dbm Systems, Inc., pp. 1-8, Jul. 18, 1998.

"CartWorks MHD Music-on-Hard-Drive QuickSchedule User's Manual", dbm Systems, Inc., pp. 1-8, Feb. 8, 1998.

"CartWorks MHD Music-on-Hard-Drive User's Manual V6.8", dbm Systems, Inc., pp. 1-11, Apr. 3, 2009.

"CartWorks On-Demand Editor User's Manual", dbm Systems, Inc., pp. 1-7, Apr. 3, 2009.

"CartWorks Script Editor User's Manual v3.12", dbm Systems, Inc., pp. 1-26, Apr. 3, 2009.

"CartWorks Spot Set Editor User's Manual", dbm Systems, Inc., pp. 1-11, Apr. 3, 2009.

"The DADpro Digital Audio Delivery System Operation Manual Version 1.0", IBM Corp., pp. 1-424, Aug. 30, 1996.

"Virtual Recorder—Basic Operations", ASC Audio Video Corporation, pp. 1-94, Sep. 9, 1996.

"Broadcast Tools: SpotBase, Playlist & TapBase", ASC Audio Video Corporation, pp. 1-2, Apr. 3, 2009.

"VR 300 Advanced Broadcast Video Server", ASC Audio Video Corporation, pp. 1-9, Apr. 3, 2009.

"VR300 Video Server User Manual, Version 1.0", ASC Audio Video Corporation, pp. 1-40, Mar. 20, 1998.

"Gravis WinDecks Version 1.12", screen shots, Gravis Computer Technology Ltd., pp. 1-10, Apr. 3, 2009.

WinDecks, User Instructions, Gravis Computer Technology Ltd., pp. 1-14, Apr. 3, 2009.

Iriver, "PMP140/120", Sep. 13, 2004, 1-2 pgs.

MG-25, Portable MPEG4 Player (MG-25), Jul. 29, 2004, 1-3 pgs.

Half-life—Wikipedia, the free encyclopedia, http://enwikipedia.org/wiki/Halfe-life, Feb. 22, 2009.

Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.

Personal Jukebox (PJB), "System Research Center and PAAD", Compaq Computer Corp., Oct. 13, 2000, http://research.compaq.com/SRC/pjb/.

Etchison, "Accelerated Discrete Adjustment of the Parameters of a Process", IBM Technical Disclosure Bulletin, vol. 15, No. 5, Oct. 1, 1972, 2 pgs.

\* cited by examiner

MEDIA MANAGEMENT FOR GROUPS OF MEDIA ITEMS

CROSS-REFERENCE TO RELATED APPLICATIONS

This application claims priority to U.S. Provisional Application No. 60/642,334, filed Jan. 7, 2005, and entitled "MEDIA MANAGEMENT FOR GROUPS OF MEDIA ITEMS," which is hereby incorporated herein by reference.

This application is related to: (i) U.S. application Ser. No. 11/097,034, filed concurrently, and entitled "PERSISTENT GROUP OF MEDIA ITEMS FOR A MEDIA DEVICE," which is hereby incorporated herein by reference; (ii) U.S. application Ser. No. 10/973,925, filed Oct. 25, 2004, and entitled "MULTIPLE MEDIA TYPE SYNCHRONIZATION BETWEEN HOST COMPUTER AND MEDIA DEVICE," which is hereby incorporated herein by reference; (iii) U.S. patent application Ser. No. 10/833,879, filed Apr. 27, 2004, and entitled "METHOD AND SYSTEM FOR SHARING PLAYLISTS," which is hereby incorporated by reference herein; (iv) U.S. patent application Ser. No. 10/833,399, filed Apr. 27, 2004, and entitled "METHOD AND SYSTEM FOR CONFIGURABLE AUTOMATIC MEDIA SELECTION," which is hereby incorporated by reference herein; (v) U.S. patent application Ser. No. 10/277,418, filed Oct. 21, 2002, and entitled "INTELLIGENT INTERACTION BETWEEN MEDIA PLAYER AND HOST COMPUTER," which is hereby incorporated herein by reference; (vi) U.S. patent application Ser. No. 10/198,639, filed Jul. 16, 2002, and entitled "METHOD AND SYSTEM FOR UPDATING PLAYLISTS," which is hereby incorporated by reference herein; and (vii) U.S. patent application Ser. No. 10/118,069, filed Apr. 5, 2002, and entitled "INTELLIGENT SYNCHRONIZATION OF MEDIA PLAYER WITH HOST COMPUTER," which is hereby incorporated herein by reference.

BACKGROUND OF THE INVENTION

1. Field of the Invention

The present invention relates to media devices and, more particularly, to management of media on media devices.

2. Description of the Related Art

A media player stores media assets, such as audio tracks or photos, that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 4.2, produced by Apple Computer, Inc.

Media assets can be moved between the host computer and the media player through use of a manual drag and drop operation, or through an automatic synchronization once a bus connection over a peripheral cable connects the media player to the host computer. Additional details on automatic synchronization are provided in U.S. Patent Publication No.: 2003/0167318 A1, which is hereby incorporated herein by reference.

In managing media assets, a user can create playlists for audio tracks. These playlists can be created at the host computer. Media assets within the playlists can then be copied to the media player. Often, the amount of media assets at the host computer exceeds the storage capacity of the media player. In such case, the user of the host computer can select a subset of the media assets at the host computer to be copied to the media player. For example, a user might select certain playlists to be copied to the media player when synchronized.

Conventionally, a media player is considered a media source for a media management application so long as the media player is connected to the host computer. That is, once the media management application detects the media player, a visual representation of the media player can be displayed. However, once the media player is disconnected, the visual representation of the media player is removed. Hence, media assets, namely, playlists of media assets, on the media player can be managed at the host computer only while the media player is connected to its host computer. In particular, if the media player is not connected to the host computer, then the media player is not a media source and, therefore, its media assets cannot be managed at the host computer. This can be a disadvantage for users that want to manage the media assets provided on the media player from the host computer.

Thus, there is a need for improved techniques to facilitate management and usage of media assets for media devices.

SUMMARY OF THE INVENTION

Broadly speaking, the invention pertains to improved techniques to utilize and manage a group of media items (or media assets) on a computing device. The group of media items can be utilized and managed at a host computer for the host computer as well as a media device (e.g., media player) that can couple to the host computer. One popular example of a group of media items is known as a playlist, which can pertain to a group of audio tracks.

One another aspect of the invention pertains to a graphical user interface that enables a user to trade-off storage capacity of a media device between media asset storage and non-media asset storage. Another aspect of the invention pertains to a graphical user interface that assists a user with selecting media items to fill a group of media items. Still another aspect of the invention pertains to providing a persistent media device playlist at a host computer. The persistent media device playlist represents a playlist dedicated to a media device that can couple to the host computer. Another aspect of the invention pertains to imposing capacity limits to a playlist, such as a media device playlist.

The invention can be implemented in numerous ways, including as a method, system, device, apparatus (including graphical user interface), or computer readable medium. Several embodiments of the invention are discussed below.

As a method of providing audio tracks for a playlist for use on a host computer and a media device, still another embodiment of the invention includes at least the acts of: displaying a listing of audio tracks that are within the playlist on a display screen of the host computer, all of the audio tracks being stored locally on the host computer and at least a portion of the audio tracks being stored on the media device; obtaining a capacity limit for the playlist; receiving a user selection to fill the playlist with additional audio tracks; and filling the playlist with additional audio tracks to the capacity limit after the user selection is received.

As a graphical user interface for providing audio tracks for a playlist for use by a host computer and a media device, one embodiment of the invention includes at least: a list of audio tracks that are within the playlist, the list being displayed on a display device of the host computer; and a selectable user interface control displayed on the display device of the host computer, the selectable user interface control, upon selection, initiates a filling of the playlist with audio tracks.

As a graphical user interface provided on a host computer for reserving storage capacity of a media device, one embodiment of the invention includes at least: a user selection control that enables a user of the host computer to reserve a portion of the storage capacity of the media device for storage of non-audio track data.

As a computer readable medium including at least computer program code for providing media items for a media item grouping for use on a host computer and a media device, one embodiment of the invention includes at least: computer program code for displaying a listing of media items that are within the media item grouping on a display screen of the host computer, all of the media items being stored locally on the host computer and at least a portion of the media items being stored on the media device; computer program code for obtaining a capacity limit for the media item grouping; computer program code for receiving a user selection to fill the media item grouping with additional media items; and computer program code for filling the media item grouping with additional media items to the capacity limit after the user selection is received.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques to utilize and manage a group of media items (or media assets) on a computing device. The group of media items can be utilized and managed at a host computer for the host computer as well as a media device (e.g., media player) that can couple to the host computer. One popular example of a group of media items is known as a playlist, which can pertain to a group of audio tracks.

One another aspect of the invention pertains to a graphical user interface that enables a user to trade-off storage capacity of a media device between media asset storage and non-media asset storage. Another aspect of the invention pertains to a graphical user interface that assists a user with selecting media items to fill a group of media items. Still another aspect of the invention pertains to providing a persistent media device playlist at a host computer. The persistent media device playlist represents a playlist dedicated to a media device that can couple to the host computer. Another aspect of the invention pertains to imposing capacity limits to a playlist, such as a media device playlist.

Embodiments of the invention are discussed below with reference to FIGS. 1-10. However, those skilled in the art will readily appreciate that the detailed description given herein with respect to these figures is for explanatory purposes as the invention extends beyond these limited embodiments.

Figure 1:
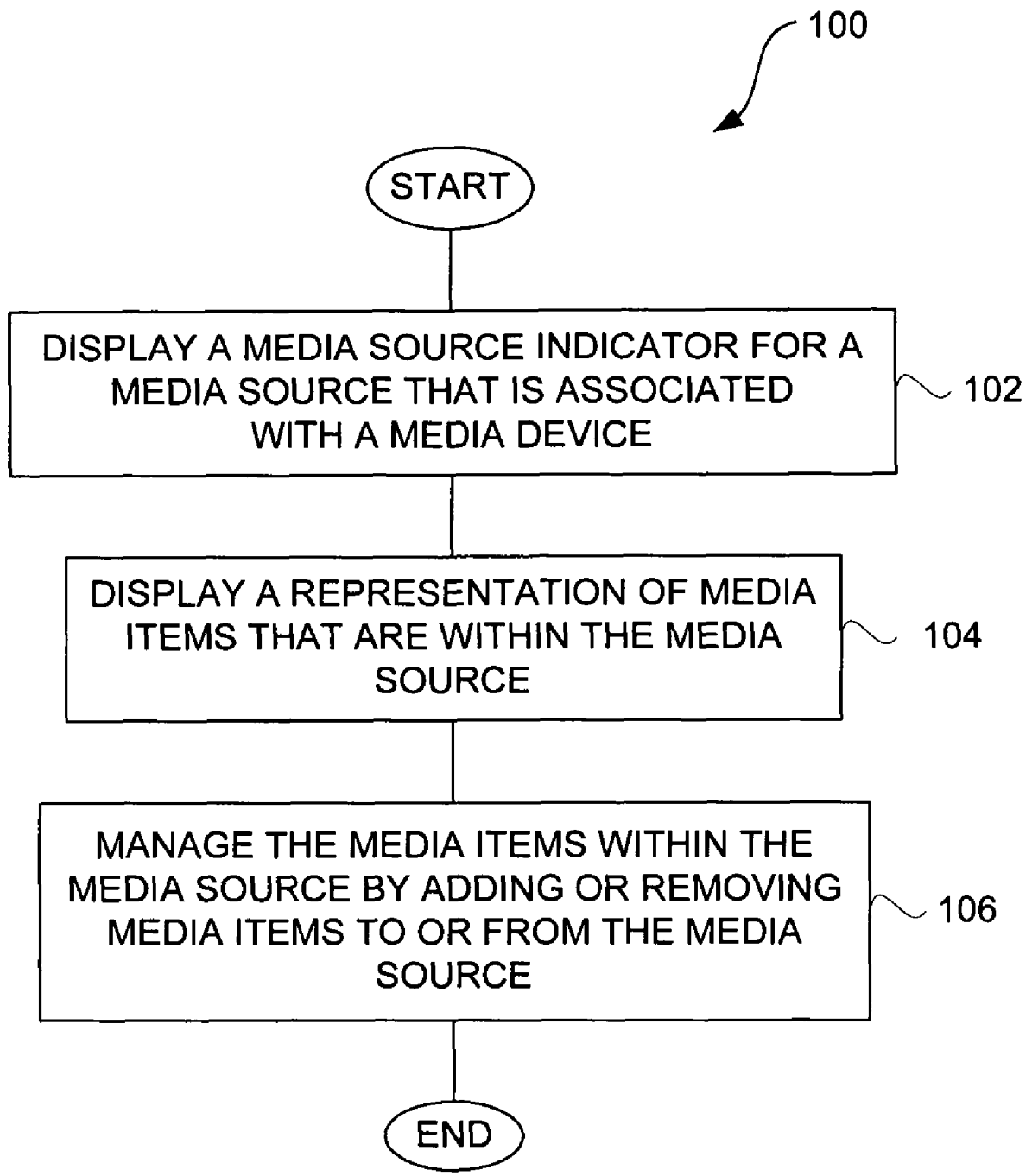
FIG. 1 is a flow diagram of a host-based media source management process according to one embodiment of the invention.

FIG. 1 is a flow diagram of a host-based media source management process 100 according to one embodiment of the invention. Typically, the host-based media source management process 100 is performed by a host computer for the benefit of not only the host computer but also a media device. Often, the host-based media source management process 100 operates following a request by a user of the host computer.

The host-based media source management process 100 initially displays 102 a media source indicator for a media source that is associated with a media device. Then, a representation of media items that are within the media source are displayed 104. The media items within the media source can then be managed 106 by adding or removing media items to or from the media source. Following the block 106, the host-based media source management process 100 is complete and ends.

In one embodiment, the media source pertains to a media device playlist. A media device playlist is a playlist that is dedicated to a particular media device. That is, the media items present on the media device should closely correspond to the media items in the media device playlist. Typically, a host computer can manage the media device playlist for both the host computer and the media device. The media items can pertain to one or more different types of media content. In one embodiment, the media items are audio tracks. In another embodiment, the media items are images (e.g., photos). However, in other embodiments, the media items can be any combination of audio, graphical or video content.

A playlist identifies particular media items that are to be played in a sequence. In general, a playlist can be considered an ordered list of media items. Internally, according to one embodiment, the playlist can be represented in a media database as a data structure that points to files of the appropriate media items residing on the storage device within the media device. Hence, for a given playlist, the pointers to the files of the appropriate media items on the media device will differ from the pointers to the files for the same media items on the host computer, thus the need to update the pointers if a particular playlist is moved between the host computer and the media device.

Figure 2:
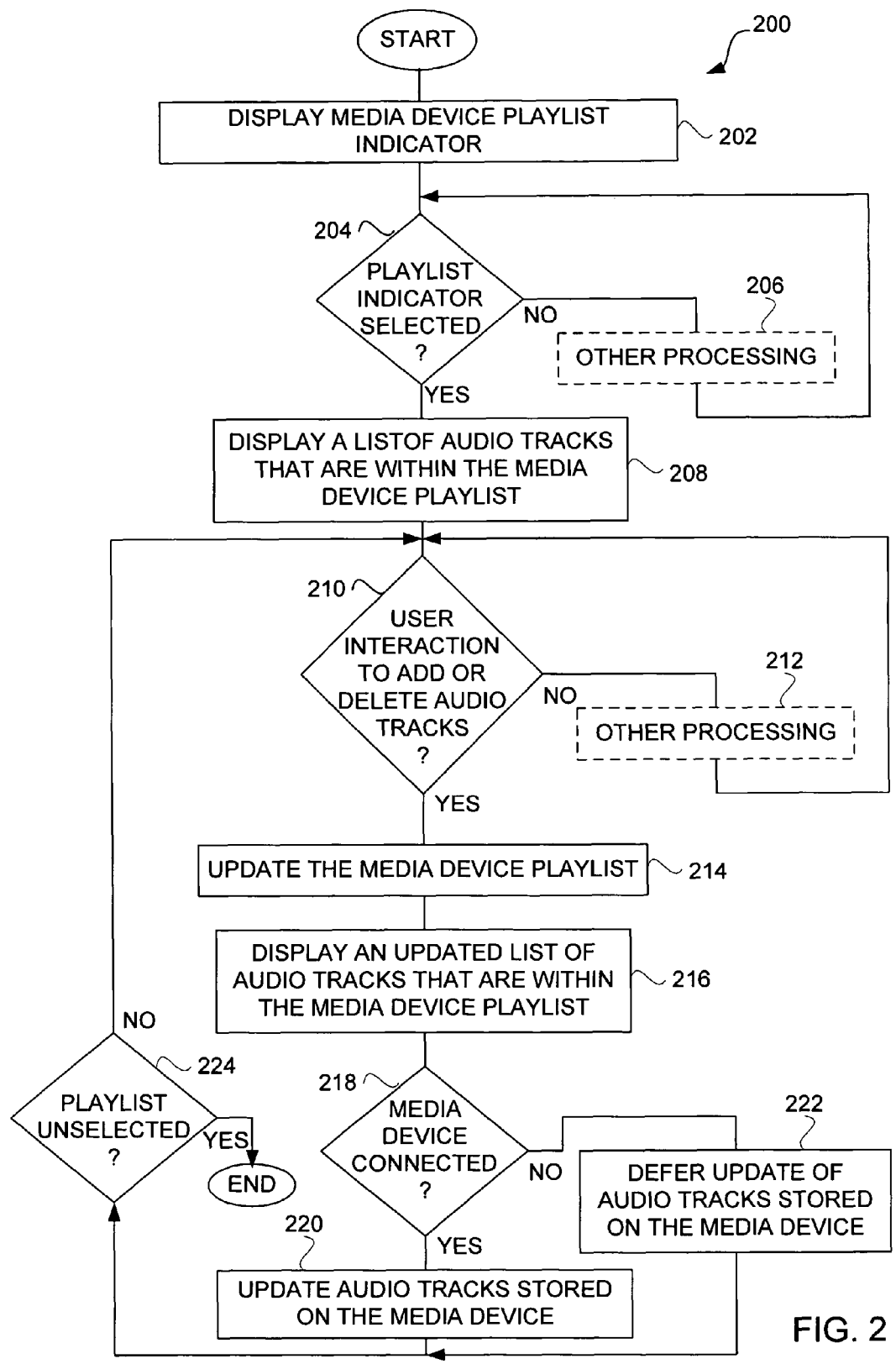
FIG. 2 is a flow diagram of a playlist management process according to one embodiment of the invention.

FIG. 2 is a flow diagram of a playlist management process 200 according to one embodiment of the invention. The playlist management process 200 is, for example, performed by a host computer, such as a host computer performing a media management application. The playlist management process 200 serves to manage media not only on the host computer but also on a portable media device that can connect to the host computer.

The playlist management process 200 initially displays 202 a media device playlist indicator. A decision 204 then determines whether the playlist indicator has been selected.

Here, a user of the host computer can cause the playlist indicator to be selected. When the decision 204 determines that the playlist indicator has not yet been selected, then other processing 206 can optionally be performed. Following the other processing 206, if any, the playlist management process 200 returns to repeat the decision 204 and subsequent blocks.

On the other hand, when the decision 204 determines that the playlist indicator has been selected, then a list of audio tracks that are within the media device playlist are displayed 208. After the list of audio tracks is displayed 208, the user of the host computer can interact with the list of audio tracks to either add or delete audio tracks from the media device playlist. In this regard, a decision 210 determines whether user interaction has requested to add or delete audio tracks to or from the media device playlist. When the decision 210 determines that no such user interaction has been requested, other processing 212 can optionally be performed. Following the other processing 212, if any, the playlist management process 200 returns to repeat the decision 210 and subsequent blocks. Once the decision 210 determines that user interaction has requested to add or delete audio tracks with respect to the media device playlist, then the media device playlist is updated 214. Then, the updated list of audio tracks that are within the media device playlist are displayed 216.

Next, a decision 218 then determines whether an associated media device is connected to the host computer. When the decision 218 determines that the media device is connected to the host computer, then audio tracks to be stored on the media device are updated 220. In other words, the additions and/or deletions of audio tracks can be performed to affect update of the audio tracks stored at the media device. On the other hand, when the decision 218 determines that the associated media device is not connected to the host computer, update of audio tracks to be stored on the media device is deferred 222. In other words, if the associated media device is "off-line" with respect to the host computer, the update to the audio tracks stored on the media device is deferred until a later point in time when the media device is "on-line" with respect to the host computer. For example, the update of the audio tracks stored on the media device can be deferred 222 until the media device is next connected to the host computer. Following the blocks 220 and 222, a decision 224 determines whether the media device playlist is unselected. When the media device playlist is unselected, the playlist management process 200 for the media device playlist ends. On the other hand, when the decision 224 determines that the media device playlist remains selected, the playlist management process 200 can return to repeat the decision 210 and subsequent operations so that management of the media device playlist can continue.

Figure 3:
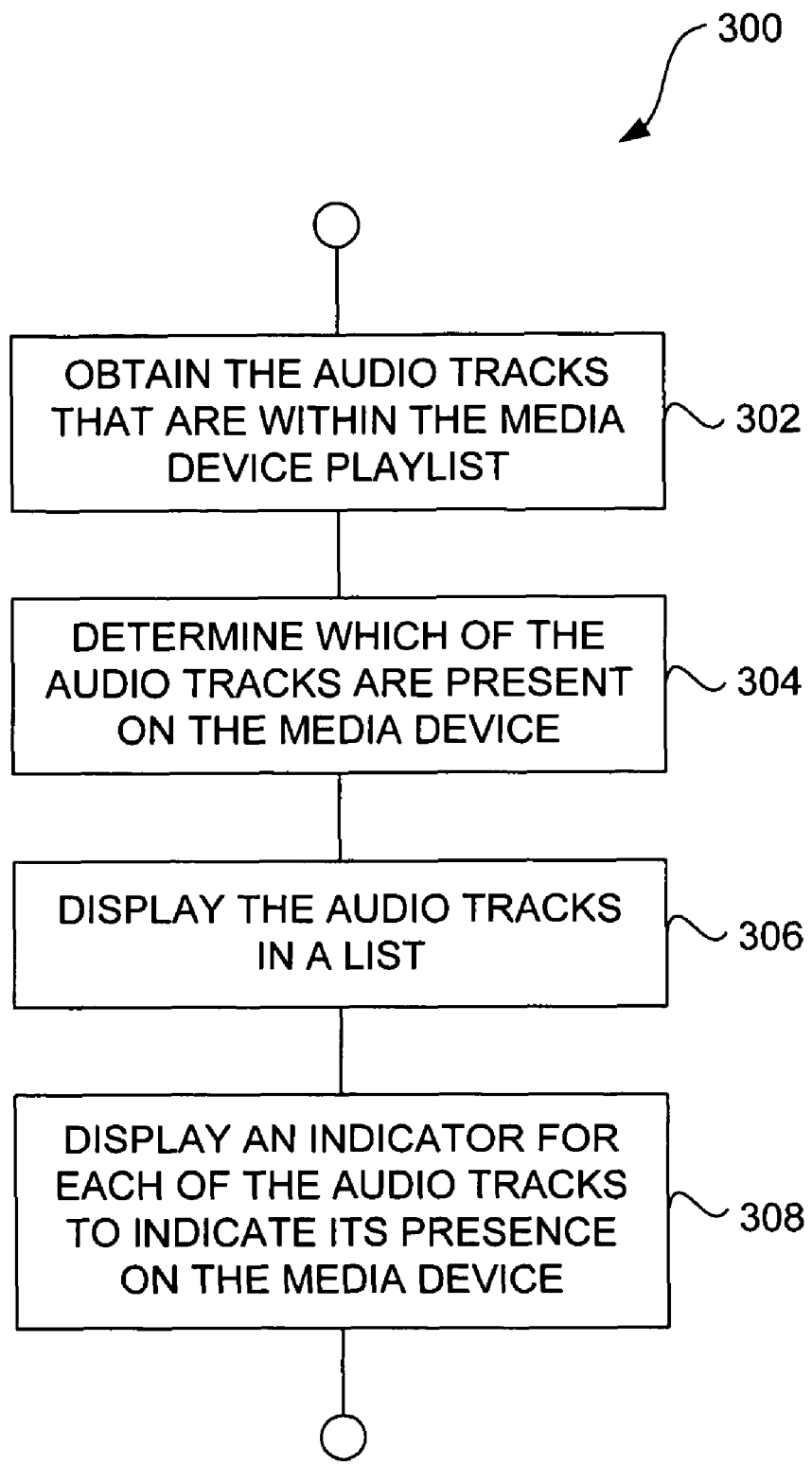
FIG. 3 is a flow diagram of a status indication process according to one embodiment of the invention.

FIG. 3 is a flow diagram of a status indication process 300 according to one embodiment of the invention. The status indication processed 300 represents additional processing that can be performed to provide status indication information for each of the audio tracks being listed in a media device playlist. The status indication process 300 is, for example, performed at block 208 of the playlist management process 200 illustrated in FIG. 2.

The status indication process 300 initially obtains 302 the audio tracks that are within the media device playlist. Then, the status indication process 300 determines 304 which of the audio tracks are present on the media device. The audio tracks can then be displayed 306 in a list on a display screen of the host computer. Additionally, an indicator for each of the audio tracks can be displayed 308 to indicate its presence on the media device. Following the block 308, the status indication processed 300 ends.

Often, all the audio tracks in the list being displayed 306 are also present in the media device. However, in various circumstances, one or more audio tracks are not present on the media device. As an example, if the media were disconnected before it could receive be updated with additional audio tracks, then the indicator displayed 308 at the host computer would indicate that such additional audio tracks are not present on the media device. As another example, if one audio track were added to the media device playlist at the host computer, but such audio track was not permitted to be copied elsewhere, then the indicator displayed 308 at the host computer would again indicate that such audio track was not present on the media device.

Figure 4:
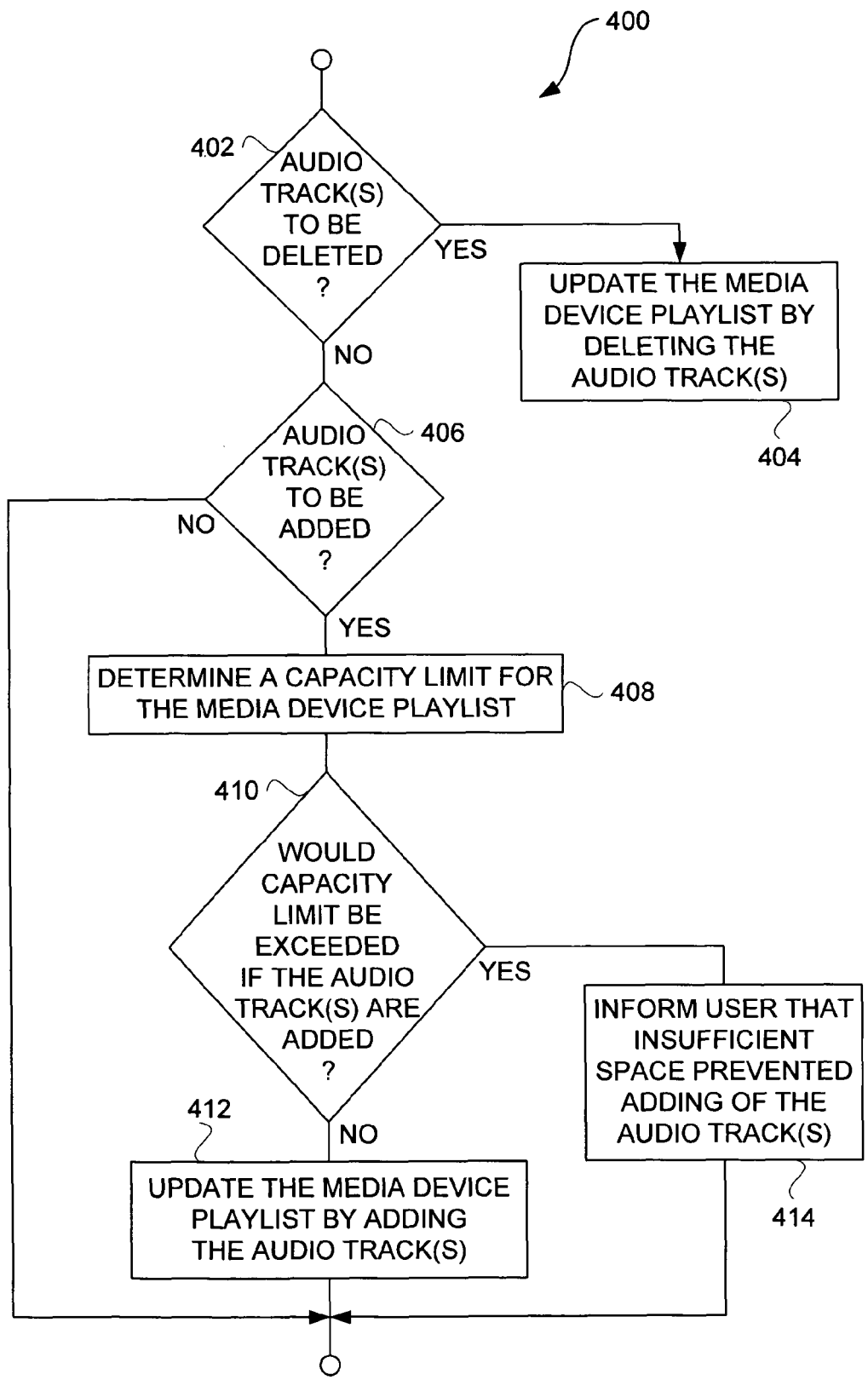
FIG. 4 is a flow diagram of an update process according to one embodiment of the invention.

FIG. 4 is a flow diagram of an update process 400 according to one embodiment of the invention. The update process 400 is performed by a host computer which serves to update the media device playlist stored on media device. The update process 400 represents one embodiment for the update 214 of the media device playlist discussed above with reference to FIG. 2.

The update process 400 begins with a decision 402 that determines whether one or more audio tracks are to be deleted from the media device playlist. When the decision 402 determines that one or more audio tracks are to be deleted from the media device playlist, then the media device playlist is updated 404 by deleting the one or more audio tracks. Following the block 404, or directly following the decision 402 when the decision 402 to determines that one or more audio tracks are not to be deleted, a decision 406 determines whether one or more audio tracks are to be added to the media device playlist. When the decision 406 determines that one or more audio tracks are to be added to the media device playlist, then a capacity limit for the media device playlist is determined 408. The capacity limit for the media device playlist can be established in a variety of different ways. In one embodiment, the capacity limit for the media device playlist is determined by the storage capacity of the media device. In another embodiment, the capacity limit for the media device playlist can be set by a user of the host computer, such as via a media management application operating on the host computer.

In any case, after the capacity limit for the media device playlist has been determined 408, a decision 410 determines whether the capacity limit would be exceeded if the one or more audio tracks are added to the media device playlist. When the decision 410 determines that the capacity limit would not be exceeded if the one or more audio tracks were added to the media device playlist, then the media device playlist can be updated 412 by adding the one or more audio tracks. Alternatively, when the decision 410 determines that the capacity limit for the media device playlist would be exceeded if the one or more audio tracks were added to the media device playlist, then the user can be informed 414 that insufficient space prevented adding of the one or more audio tracks to the media device playlist. Following the blocks 412 and 414, as well as following the decision 406 when no audio tracks are to be added, the update process 400 ends.

In another embodiment, the update process 400 can operate differently when the decision 410 determines that the capacity limit for the media device playlist would be exceeded if the one or more audio tracks were added to the media device playlist. For example, instead of merely informing 414 the user that insufficient space prevented adding of the one or more audio tracks to the media device playlist, the update process 400 could permit the additions at the host computer following the informing 414 which would provide a warning.

However, in such an embodiment, the subsequent update 220 of the media device would not operate to copy excess media items to the media device. Status indicators, such as described above with reference to FIG. 3, could be used to designate the excess media items at the host computer's version of the media device playlist but not on the media device itself.

Figure 5:
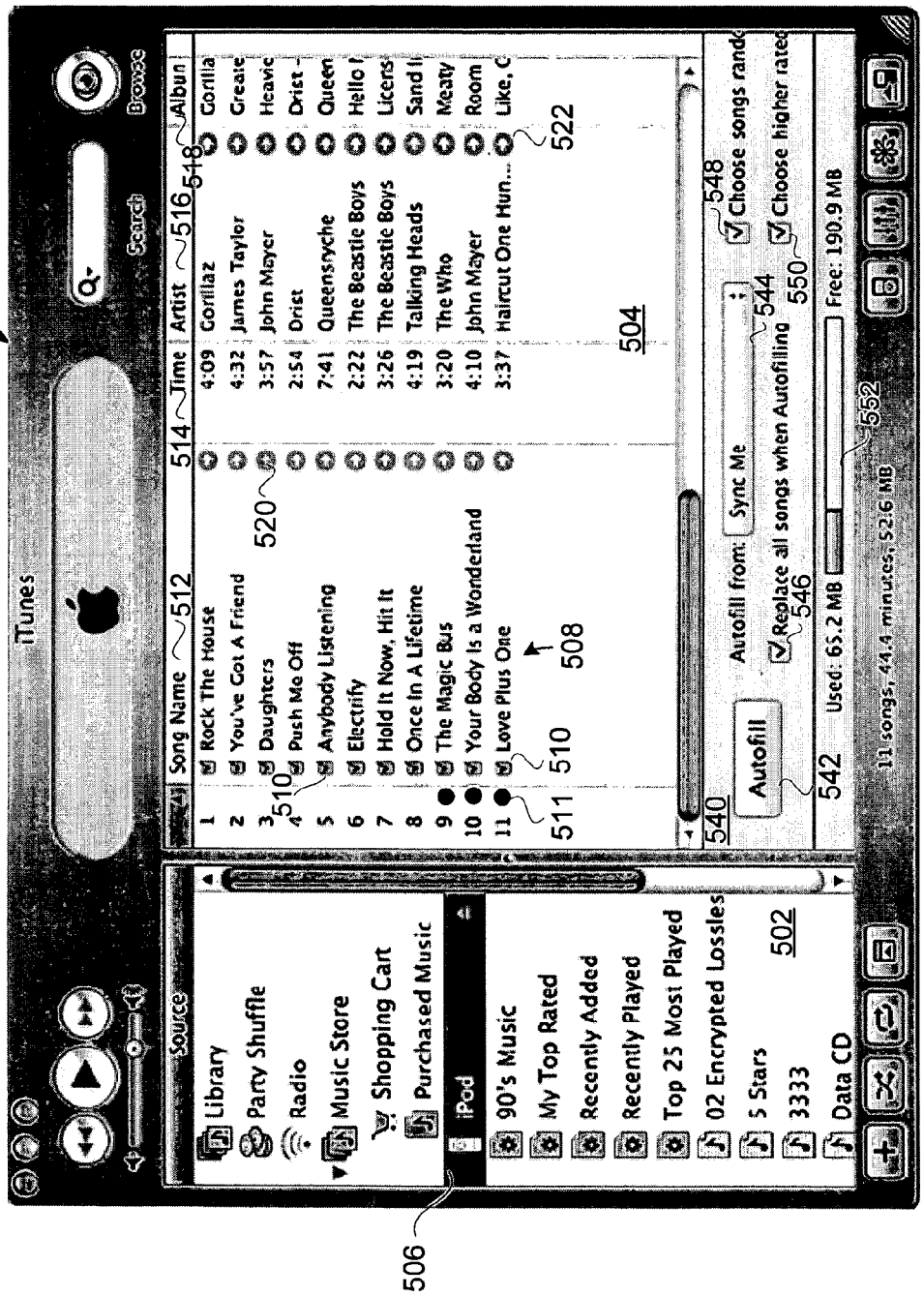
FIG. 5 is a screen shot of a media management application window according to one embodiment of the invention.

FIG. 5 is a screen shot of a media management application window 500 according to one embodiment of the invention. The media management application window 500 is, for example, produced by a media management application operating on a host computer.

The media management application window 500 includes a source region 502 and a track listing area 504. The source region 502, among other things, depicts a media device indicator 506. The media device indicator 506 corresponds to a media device playlist. In this example, the media device indicator 506 is a graphic icon. Additionally, the media device indicator 506 can also include a text description. In this example, the media device indicator 506 also provides the text "iPod". The track listing area 504 includes a list of audio tracks 508 together with associated status indicators 510 and 511. The list of audio tracks 508 are those audio tracks associated with the media device playlist. As shown in FIG. 5, each of the audio tracks within the list of audio tracks 508 include a corresponding one of the status indicators 510. In this example, the status indicators 510 are all shown being "checked," thus indicating that the associated audio tracks are to be played when playing through the audio tracks within the list of audio tracks 508. Alternatively, with the status indicator 510 "unchecked" the associated audio track is skipped (i.e., not played) played when playing through the audio tracks within the list of audio tracks 508. Further, each of the audio tracks within the list of audio tracks 508 can also include a corresponding one of the status indicators 511. In this example, the status indicator 511 is being display adjacent to only the audio tracks 9, 10 and 11 of the list of audio tracks 508. The status indicator 511 in this example indicates that the corresponding audio track has not yet been copied to the associated media device. Typically, the media management application will copy all of the audio tracks within the list of audio tracks 508 to the media device once the media device connects to the host computer. However, in the event that certain ones of the audio tracks within the list of audio tracks 508 are not currently present on the media device, the status indicator 511 associated with the certain ones of the audio tracks would be displayed.

The track listing area 504 also presents certain information pertaining to each of the audio tracks. As shown in FIG. 5, the certain information can pertain to song name 514, duration of time of the audio track 514, artist name 516, and album name 518. Additionally, the track listing area 504 also includes "go to" links 520 and 522 for each of the audio tracks. Each of the "go to" links 520 direct the user to an album page for an album including the associated audio track (song). Each of the "go to" links 522 directs the user to an artist page associated with the artist identified by the artist name 516. As shown in FIG. 5, the "go to" links can be implemented as small buttons with arrow symbols therein.

Furthermore, as discussed below, the media management application window 500 further includes a fill control region 540. The fill control region 540 includes an Autofill button 542 that can be selected by a user. Additionally, the fill control region 540 provides graphical user interface control items that can be selected or manipulated by the user to affect the nature of an autofill operation once the Autofill button 542 is pressed. Namely, the fill control region 540 includes a source selector 544 so that a source of media from which the autofill operation is to be performed can be selected. In addition, the fill control region 540 includes selectors 546-550 that enable the user to select certain features. For example, the selector 546 allows a user to determine whether existing songs are to be replaced when autofilling the media device playlist. The selector 548 determines whether songs are to be randomly chosen when performing the autofill operation. The selector 550 determines whether higher-rated songs (e.g., user ratings) are to be chosen when performing the autofill operation. Still further, the fill control region 540 can display an indication 552 of an amount of available storage capacity for the media device.

In general, the autofill region 540 assists a user in providing criteria for media selection when autofilling. Although the fill control region 540 includes the selectors 548 and 550, different or additional selectors or other types of controls can be utilized. These additional controls can also be used to specify criteria for selecting audio tracks (i.e., songs) when autofilling the media device playlist. Some examples of these additional selectors or controls are associated with criteria such as: artist, album, composer, bit rate, date added (e.g., recently added), genre, play count, name, year, etc. A user can also define the rules or conditions for determining audio tracks to be selected when autofilling. The rules or conditions can include rule components, such as: contains, does not contain, is, is not, starts with, ends with, in the range, etc. Besides criteria controls and rules, importance selectors (e.g., sliders) or other controls permit a user to further control how the audio tracks are selected when autofilling. For example, a criteria selection based on user ratings as well as an importance value from an importance selector (e.g., slider) can be set to influence which audio tracks are to be selected from a source of media. However, the particular order in which such audio tracks are acquired can still be is partially randomly determined or can be determined based on the criteria (date added) or rules.

Figure 6:
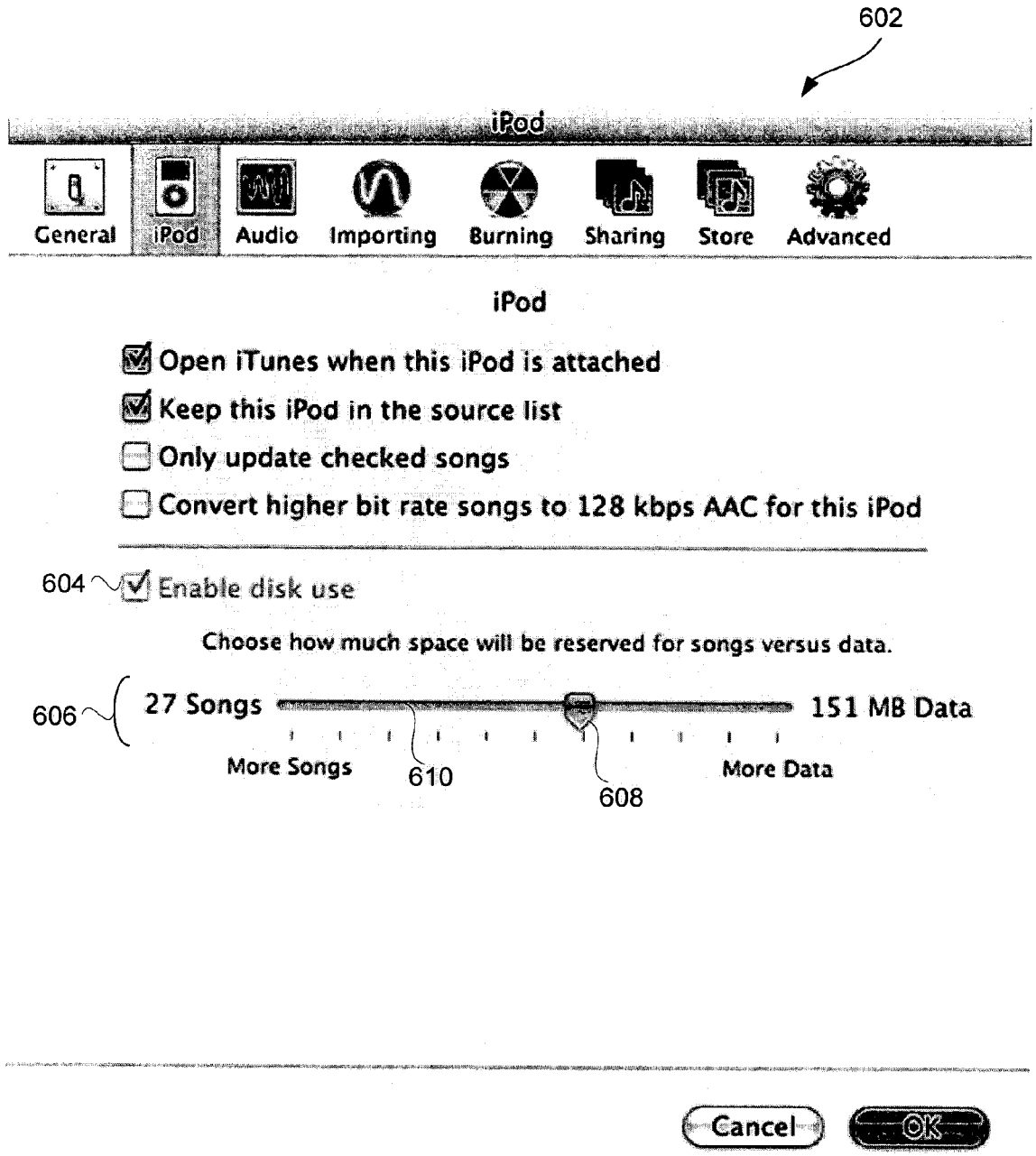
FIG. 6 is a screen shot of a preference window for a media management application according to one embodiment of the invention.

FIG. 6 is a screen shot of a preference window 602 for a media management application according to one embodiment of the invention. In this embodiment, the media management application is able to set preferences that determine how a media device operates to store data. Namely, in this example, the media device is known as the iPod® media player, which is available from Apple Computer, Inc. Here, the preference window 602 includes a selector 604 that enables the user to determine whether the media device is permitted to be used as a portable disk drive for data storage. Here, the data storage when being used as a portable storage disk would be distinct from storage of media content, such as media content of a media device playlist.

The preference window 602 also includes a graphical user interface control 606 that assists the user in specifying how much of the available storage capacity of the media device should be used for data as well as how much of the storage capacity should be used for media items, such as audio tracks or songs. In one embodiment, the graphical user interface control 606 is a slider such as shown in FIG. 6. The slider shown in FIG. 6 can be manipulated by the user to trade-off the number of media items (e.g., 27 songs) that can be stored to the media device with the amount of other data (e.g., 151 MB) that can be stored. As a slider reference 608 is manipulated by the user along a slider bar 610, the number of songs and the amount of data change. For example, if the user were to move the slider reference 608 to the left as shown in FIG. 6, the number of songs depicted would increase to a value greater than 27, while the amount of other data would decrease below 151 MB. For ease of computation, in one embodiment, each song can be considered 1 MB or some other predetermined representative size. Stated differently, the slider shown in FIG. 6 can be manipulated by the user to trade-off the amount of media item storage available on the media device with the amount of non-media item storage available on the media device.

Figure 7:
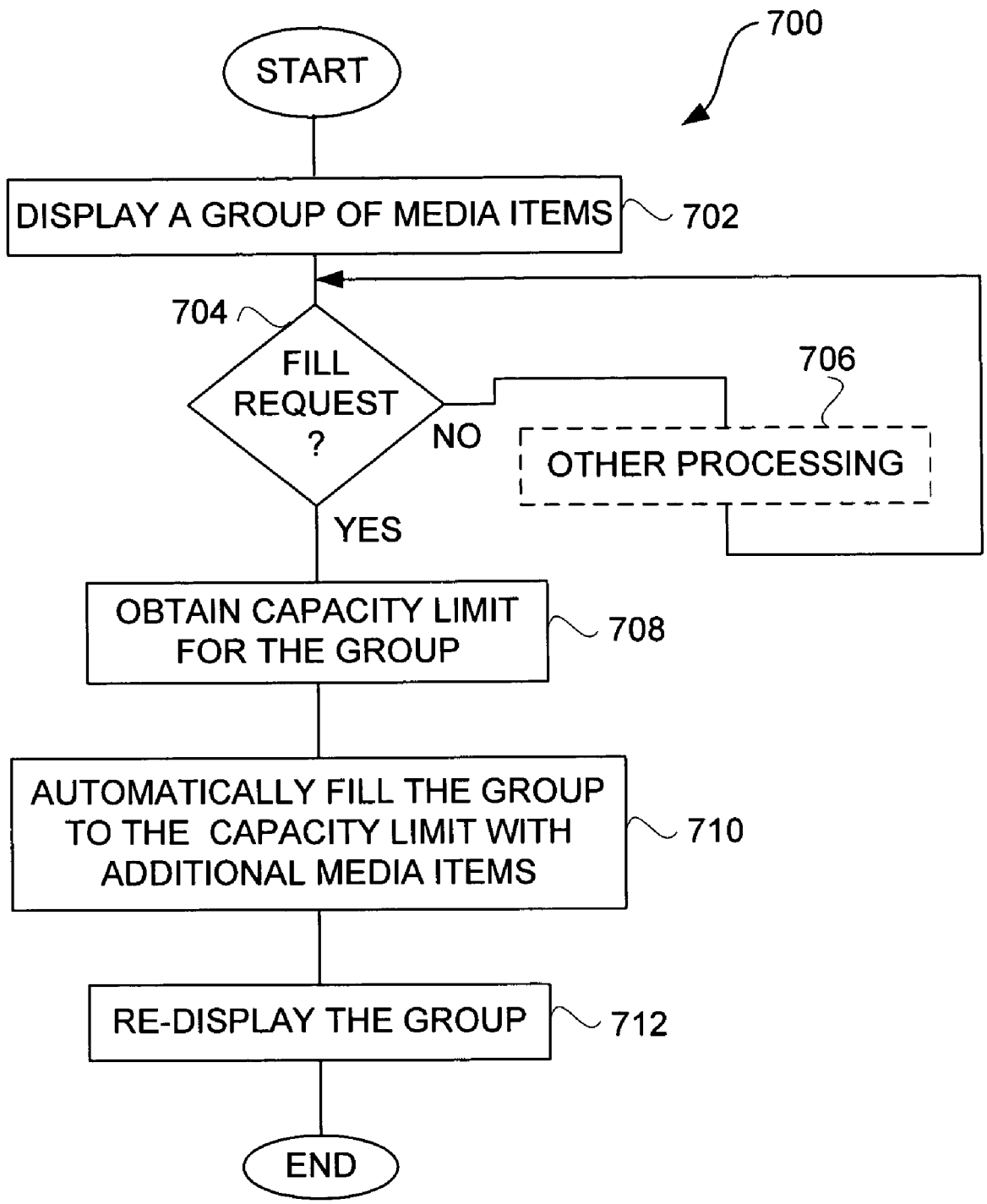
FIG. 7 if a flow diagram of a group fill process according to one embodiment of the invention.

FIG. 7 if a flow diagram of a group fill process 700 according to one embodiment of the invention. The group fill processed 700 is, for example, performed by a host computer that operates a media management application that is able to allow users to group media items.

The group fill process 700 initially displays 702 a group of media items. Next, a decision 704 determines whether a fill request has been received. When the decision 704 determines that a fill request has not been received, then other processing 706 can be optionally performed. In any case, the group fill process 700 returns to repeat the decision 704 to await a fill request.

Once the decision 704 determines that a fill request has been received, a capacity limit for the group is obtained 708. The capacity limit for the group can be stored on the host computer in one embodiment of the invention. In another embodiment, the capacity limit can be determined at the host computer. In still another embodiment, the capacity limit for the group can be determined based on information provided by a media device coupled to the host computer. In any event, after the capacity limit for the group has been obtained 708, the group fill process 700 operates to automatically fill 710 the group to the capacity limit with additional media items. At this point, the group of media items is deemed full of media items. It should be understood that "filling" the group of media items or consuming the capacity limit does not require that there be no remaining free capacity. For example, in one implementation, the automatic fill 710 can fill the group with as many complete media items as it can hold. In any case, following the automatic fill 710, the group can be re-displayed 712. Following the re-display 712 of the group, the group fill process 700 is complete. Although the group fill process 700 could end following the re-display 712 of the group, the group fill process 700 can also return to repeat the decision 704 and subsequent operations so that the group fill process can again performed (with or without any intermediate other processing).

One example of a group media items is a playlist. The media items within the playlist are, for example, audio tracks.

Figure 8A:
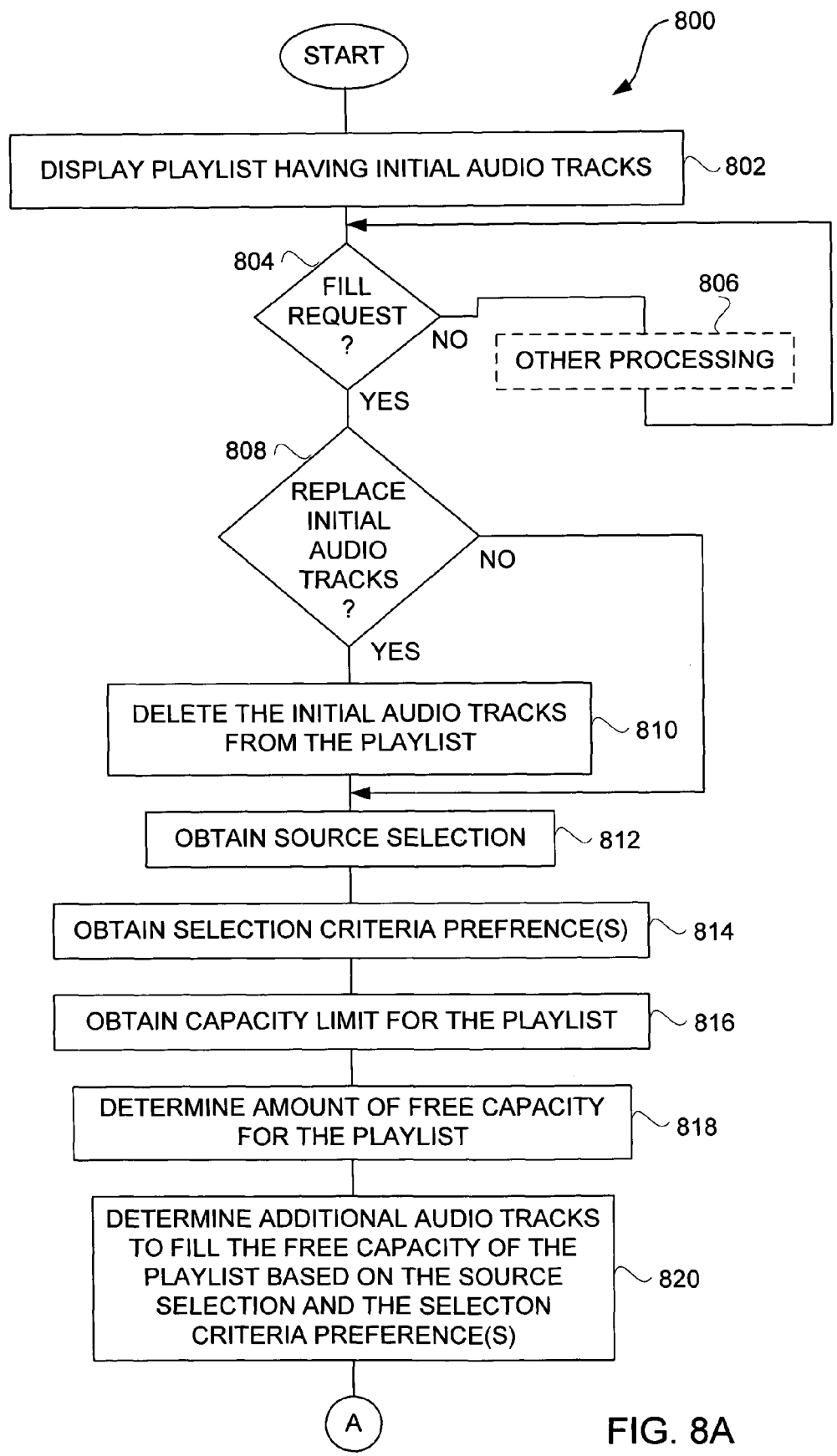
FIGS. 8A and 8B are flow diagrams of a playlist fill process according to one embodiment of the invention.
Figure 8B:
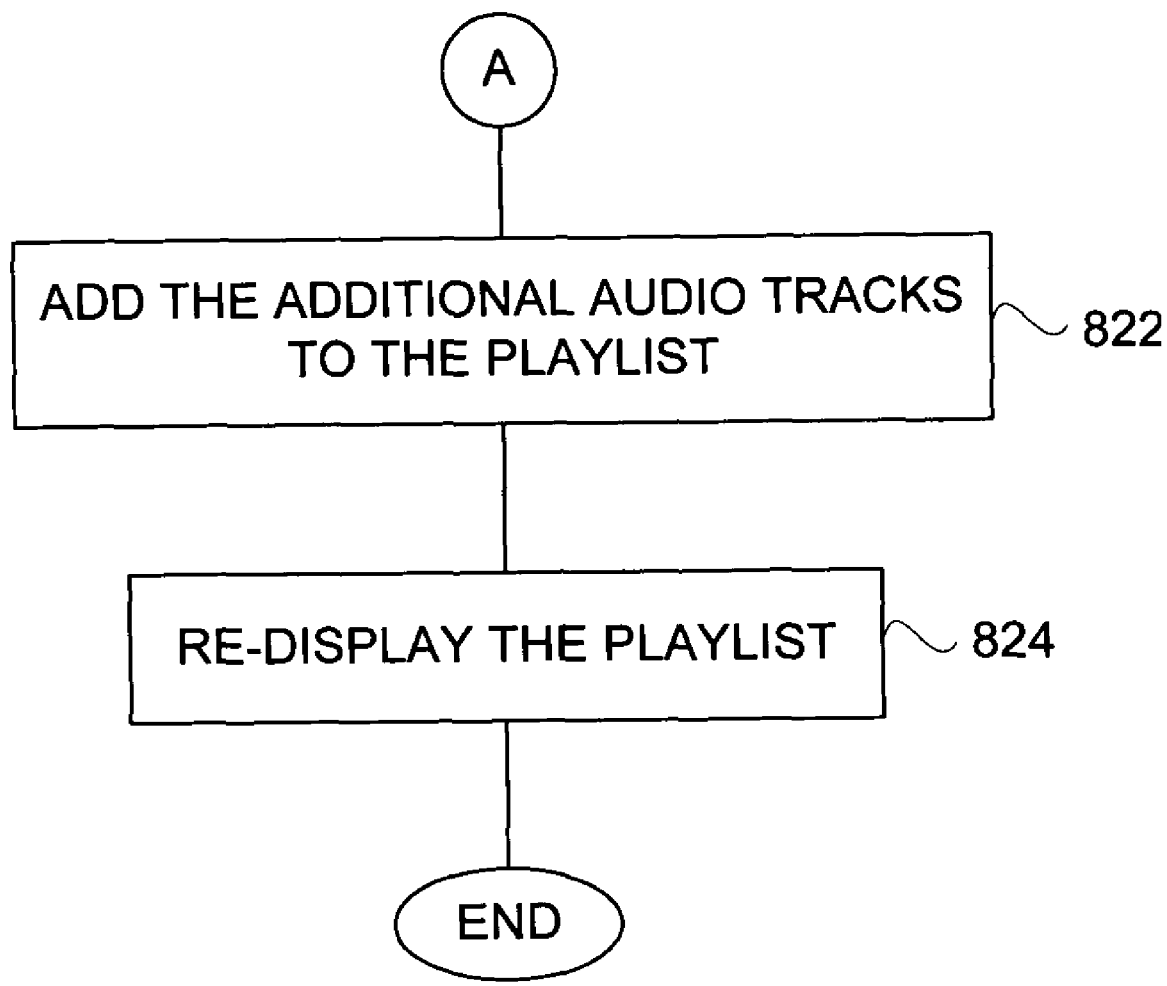

FIGS. 8A and 8B are flow diagrams of a playlist fill process 800 according to one embodiment of the invention. The playlist fill process 800 initially displays 802 a playlist having initial audio tracks. Next, a decision 804 determines whether a fill request has been received. Here, the fill request is typically from a user of a host computer that operates the playlist fill process 800. When the decision 804 determines that a fill request has not yet been received, other processing 806 can optionally be performed. Following the other processing 806, if any, the playlist fill process 800 returns to repeat the decision 804 and subsequent blocks.

Once the decision 804 determines that a fill request has been received, a decision 808 determines whether the initial audio tracks of the playlist are to be replaced. When the decision 808 determines that the initial audio tracks are to be replaced, the initial audio tracks are deleted 810 from the playlist. Alternatively, when the decision 808 determines that the initial audio tracks are not to be replaced, then the block 810 is bypassed.

Following the block 810, or its being bypassed, a source selection is obtained 812. The source selection represents a source for additional media items that can be added to the playlist. In addition, selection criteria preferences can be obtained 814. In one embodiment, the selection criteria preferences are preferences, typically set by the user, that specify criteria to be utilized in the selection of the additional media items to fill the playlist. Still further, a capacity limit for the playlist can be obtained 816. As noted above, the capacity limit can be influenced by user settings and/or media device capacities.

Next, an amount of free capacity for the playlist is determined 818. In one embodiment, the free capacity for the playlist represents in the difference between the current capacity for the playlist and the capacity limit for the playlist. Once the amount of free capacity has been determined 818, additional audio tracks to fill the free capacity of the playlist are determined 820 based on the source selection and the selection criteria preferences. Then, the additional audio tracks that have been determined 820 are added 822 to the playlist. Finally, the playlist can be re-displayed 824. Once re-displayed, the playlist is illustrated with a full complement of audio tracks.

Following the block 824, the playlist fill process 800 is complete and ends. However, it should be realized that the playlist fill process 800 can be repeated, if desired, so as to obtain different selections of audio tracks within the playlist, provided the source selection has an adequate quantity of audio tracks to be chosen from and provided at least some of the initial audio tracks are being replaced.

In another embodiment, the replacement (i.e., deletion 810) of initial tracks can be limited to those of the initial audio tracks that have been played since last updated with a host computer. In still another embodiment, the user of the host computer can manually delete one or more of the initial audio tracks from the playlist.

Figure 9:
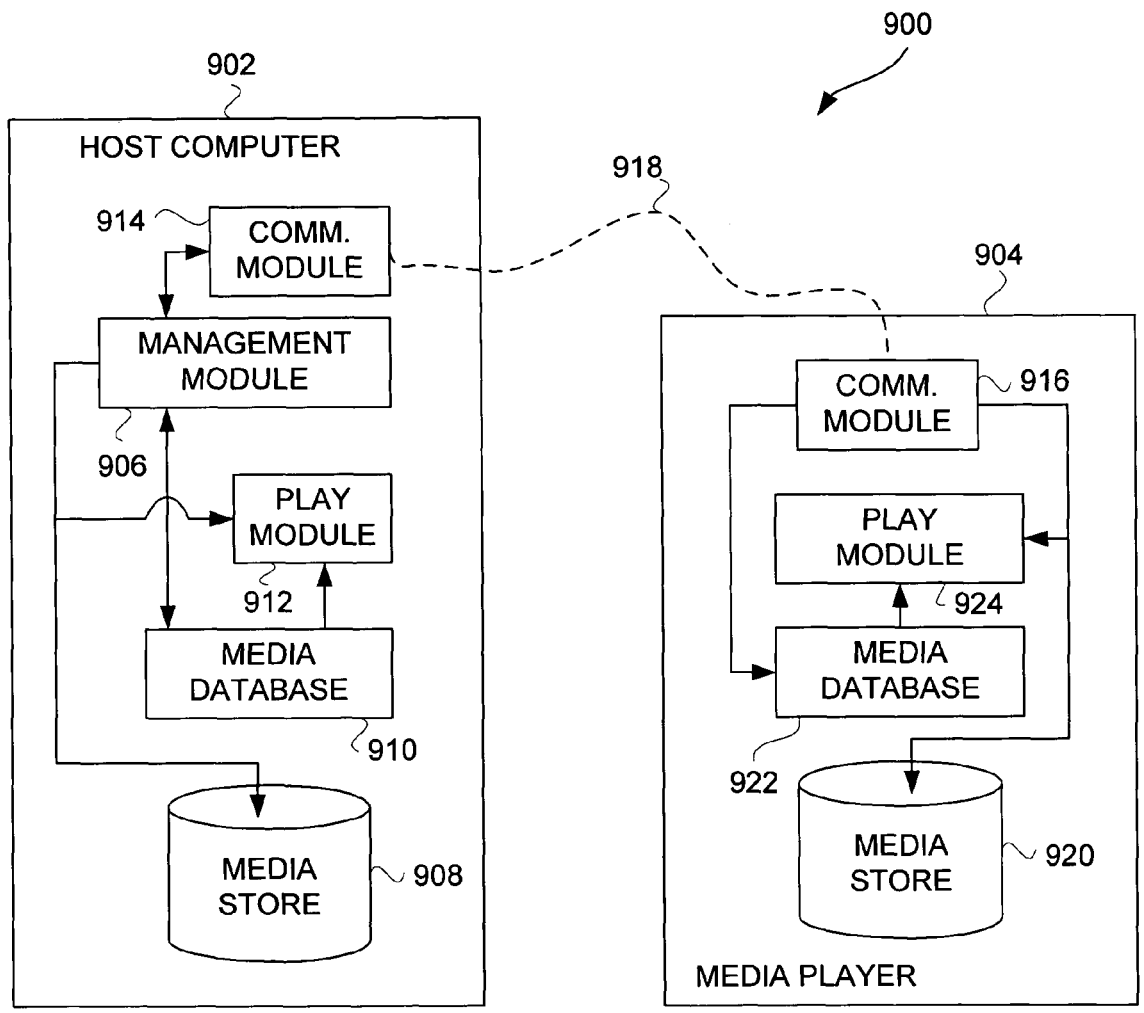
FIG. 9 is a block diagram of a media management system according to one embodiment of the invention.

FIG. 9 is a block diagram of a media management system 900 according to one embodiment of the invention. The media management system 900 includes a host computer 902 and a media player 904. The host computer 902 is typically a personal computer. The host computer, among other conventional components, includes a management module 906 which is a software module. The management module 906 provides for centralized management of media items (and/or playlists) not only on the host computer 902 but also on the media player 904. More particularly, the management module 906 manages those media items stored in a media store 908 associated with the host computer 902. The management module 906 also interacts with a media database 910 to store media information associated with the media items stored in the media store 908.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 902 includes a play module 912. The play module 912 is a software module that can be utilized to play certain media items stored in the media store 908. The play module 912 can also display (on a display screen) or otherwise utilize media information from the media database 910. Typically, the media information of interest corresponds to the media items to be played by the play module 912.

The host computer 902 also includes a communication module 914 that couples to a corresponding communication module 916 within the media player 904. A connection or link 918 removeably couples the communication modules 914 and 916. In one embodiment, the connection or link 918 is a cable that provides a data bus, such as a FIREWIRE™ bus or USB bus, which is well known in the art. In another embodiment, the connection or link 918 is a wireless channel or connection through a wireless network. Hence, depending on implementation, the communication modules 914 and 916 may communicate in a wired or wireless manner.

The media player 904 also includes a media store 920 that stores media items within the media player 904. Optionally, the media store 920 can also store data, i.e., non-media item storage. The media items being stored to the media store 920 are typically received over the connection or link 918 from the host computer 902. More particularly, the management module 906 sends all or certain of those media items residing on the media store 908 over the connection or link 918 to the media store 920 within the media player 904. Additionally, the corresponding media information for the media items that is also delivered to the media player 904 from the host computer 902 can be stored in a media database 922. In this regard, certain media information from the media database 910 within the host computer 902 can be sent to the media database 922 within the media player 904 over the connection or link 918. Still further, playlists identifying certain of the media items can also be sent by the management module 906 over the connection or link 918 to the media store 920 or the media database 922 within the media player 904.

Furthermore, the media player 904 includes a play module 924 that couples to the media store 920 and the media database 922. The play module 924 is a software module that can be utilized to play certain media items stored in the media store 920. The play module 924 can also display (on a display screen) or otherwise utilize media information from the media database 922. Typically, the media information of interest corresponds to the media items to be played by the play module 924.

Hence, in one embodiment, the media player 904 has limited or no capability to manage media items on the media player 904. However, the management module 906 within the host computer 902 can indirectly manage the media items residing on the media player 904. For example, to "add" a media item to the media player 904, the management module 906 serves to identify the media item to be added to the media player 904 from the media store 908 and then causes the identified media item to be delivered to the media player 904. As another example, to "delete" a media item from the media player 904, the management module 906 serves to identify the media item to be deleted from the media store 908 and then causes the identified media item to be deleted from the media player 904. As still another example, if changes (i.e., alterations) to characteristics of a media item were made at the host computer 902 using the management module 906, then such characteristics can also be carried over to the corresponding media item on the media player 904. In one implementation, the additions, deletions and/or changes occur in a batch-like process during synchronization of the media items on the media player 904 with the media items on the host computer 902.

In another embodiment, the media player 904 has limited or no capability to manage playlists on the media player 904. However, the management module 906 within the host computer 902 through management of the playlists residing on the host computer can indirectly manage the playlists residing on the media player 904. In this regard, additions, deletions or changes to playlists can be performed on the host computer 902 and then by carried over to the media player 904 when delivered thereto.

As previously noted, synchronization is a form of media management. The ability to automatically initiate synchronization was also previously discussed above and in the related application noted above. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 10:
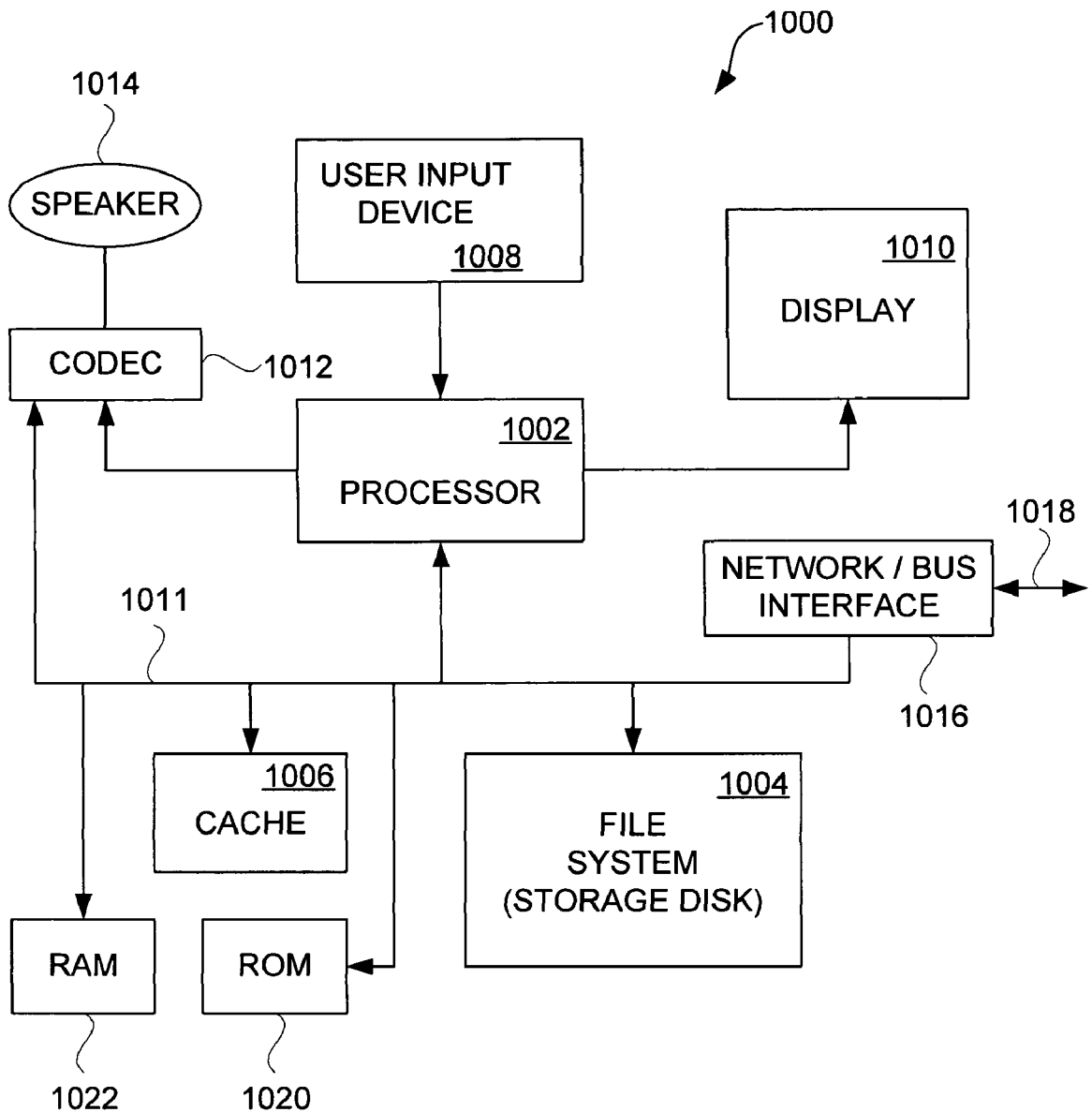
FIG. 10 is a block diagram of a media player according to one embodiment of the invention.

FIG. 10 is a block diagram of a media player 1000 according to one embodiment of the invention. The media player 1000 includes a processor 1002 that pertains to a microprocessor or controller for controlling the overall operation of the media player 1000. The media player 1000 stores media data pertaining to media items in a file system 1004 and a cache 1006. The file system 1004 is, typically, a storage disk or a plurality of disks. The file system 1004 typically provides high capacity storage capability for the media player 1000. The file system 1004 can store not only media data but also non-media data (e.g., when operated in a disk mode). However, since the access time to the file system 1004 is relatively slow, the media player 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the media player 1000 is a portable media player that is powered by a battery (not shown). The media player 1000 also includes a RAM 1020 and a Read-Only Memory (ROM) 1022. The ROM 1022 can store programs, utilities or processes to be executed in a non-volatile manner. The RAM 1020 provides volatile data storage, such as for the cache 1006.

The media player 1000 also includes a user input device 1008 that allows a user of the media player 1000 to interact with the media player 1000. For example, the user input device 1008 can take a variety of forms, such as a button, keypad, dial, etc. Still further, the media player 1000 includes a display 1010 (screen display) that can be controlled by the processor 1002 to display information to the user. A data bus 1011 can facilitate data transfer between at least the file system 1004, the cache 1006, the processor 1002, and the CODEC 1012.

In one embodiment, the media player 1000 serves to store a plurality of media items (e.g., songs) in the file system 1004. When a user desires to have the media player play a particular media item, a list of available media items is displayed on the display 1010. Then, using the user input device 1008, a user can select one of the available media items. The processor 1002, upon receiving a selection of a particular media item, supplies the media data (e.g., audio file) for the particular media item to a coder/decoder (CODEC) 1012. The CODEC 1012 then produces analog output signals for a speaker 1014. The speaker 1014 can be a speaker internal to the media player 1000 or external to the media player 1000. For example, headphones or earphones that connect to the media player 1000 would be considered an external speaker.

The media player 1000 also includes a network/bus interface 1016 that couples to a data link 1018. The data link 1018 allows the media player 1000 to couple to a host computer. The data link 1018 can be provided over a wired connection or a wireless connection. In the case of a wireless connection, the network/bus interface 1016 can include a wireless transceiver.

In one implementation, the host computer can utilize an application resident on the host computer to permit utilization and provide management for playlists, including a media device playlist. One such application is iTunes®, version 4.2, produced by Apple Computer, Inc. of Cupertino, Calif.

Although the media items (or media assets) of emphasis in several of the above embodiments were audio items (e.g., audio files or songs), the media items are not limited to audio items. For example, the media items can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a media device playlist can be persistently represented and manipulated at a host computer regardless of whether the associated media device is connected to the host computer. Another advantage of the invention is that a playlist can be managed in accordance with a capacity limit. Still another advantage of the invention is that a capacity limit to be imposed on a playlist can be adjusted to provide reserved storage capacity for data storage (e.g., associated with a disk mode usage of the media device). Yet still another advantage of the invention is that a user can initiate a fill operation to cause a playlist to be automatically filled from a larger media source.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of providing audio tracks for a playlist for use on a host computer and a media device, the media device having a storage capacity, said method comprising:
   displaying a listing of audio tracks that are within the playlist on a display screen of the host computer, all of the audio tracks being stored locally on the host computer and at least a portion of the audio tracks being stored on the media device;
   determining a current capacity for the playlist;
   setting a capacity limit for the playlist, the capacity limit being set to a user-specified amount that is less than the storage capacity of the media device;
   receiving a user selection to initiate automatic filling of the playlist with additional audio tracks;
   comparing the current capacity for the playlist to the capacity limit for the playlist to determine available capacity for the playlist; and
   thereafter automatically filling the playlist with additional audio tracks to the capacity limit in response to the user selection to automatically fill the playlist if the current capacity is less than the capacity limit.

2. A method as recited in claim 1, wherein said filling selects the additional audio tracks from an audio source available to the host computer.

3. A method as recited in claim 1, wherein said filling selects the additional audio tracks from an audio source available to the host computer in a random manner.

4. A method as recited in claim 1, wherein said filling selects the additional audio tracks from an audio source available to the host computer based on a user rating.

5. A method as recited in claim 1, wherein said filling comprises:
   (d1) initially removing one or more existing audio tracks from the playlist; and
   (d2) filling the playlist with audio tracks to the capacity limit.

6. A method as recited in claim 5, wherein said filling selects the additional audio tracks from an audio source available to the host computer.

7. A method as recited in claim 5, wherein said filling selects the additional audio tracks from an audio source available to the host computer in a random manner.

8. A method as recited in claim 5, wherein said filling selects the additional audio tracks from an audio source available to the host computer based on a user rating.

9. A method as recited in claim 1, wherein the playlist is a dedicated media device playlist for the media device.

10. A graphical user interface for providing audio tracks for a playlist for use by a host computer and a media device, the host computer including at least a processor and a display device, said graphical user interface comprising:
    a list of audio tracks that are within the playlist, said list being displayed on the display device of the host computer;
    a fill criteria control that is user-selectable and used to specify at least one user-selected fill criteria; and
    a selectable user interface control displayed on the display device of the host computer, said selectable user interface control, upon selection, initiates an automated filling of the playlist with selected ones of the audio tracks being chosen in accordance with the at least one user-selected fill criteria,
    wherein the playlist has a capacity limit, and
    wherein the capacity limit is set to a user-specified amount that is less than the storage capacity of the media device, and wherein the automated filling of the playlist is to the capacity limit.

11. A graphical user interface as recited in claim 10, wherein said selectable user interface control is a button.

12. A graphical user interface as recited in claim 10, wherein said graphical user interface further comprises:
an audio track source selector that determines a media source from which audio tracks are available to be used in filling of the playlist.

13. A graphical user interface as recited in claim 12, wherein said graphical user interface further comprises:
an audio track replacement selector that determines whether pre-existing audio tracks within the playlist are to be removed before filling of the playlist.

14. A graphical user interface as recited in claim 10, wherein said graphical user interface further comprises:
an audio track replacement selector that determines whether one or more pre-existing audio tracks within the playlist are to be removed before filling of the playlist.

15. A graphical user interface as recited in claim 14, wherein the one or more pre-existing audio tracks being removed are those that have been played by the media device.

16. A graphical user interface as recited in claim 10, wherein said fill criteria control comprises:
a random selection selector that determines whether audio tracks used to fill the playlist are to be randomly chosen.

17. A graphical user interface as recited in claim 10, wherein said fill criteria control comprises:
a rating selection selector that determines whether audio tracks used to fill the playlist are to be chosen based on ratings.

18. A graphical user interface as recited in claim 10, wherein said graphical user interface further comprises:
an available capacity indication that indicates an available capacity of the playlist.

19. A graphical user interface as recited in claim 10, wherein the media device has a storage capacity, and
wherein said graphical user interface comprises:
a user selection control that enables a user of the host computer to reserve a portion of the storage capacity of the media device for storage of non-media item data.

20. A graphical user interface as recited in claim 19, wherein a remaining portion of the storage capacity of the media device is for storage of media item data.

21. A graphical user interface as recited in claim 19, wherein said user selection control comprises:
a slider that enables the user of the host computer to control whether or not to reserve a portion of the storage capacity for storage of non-media item data.

22. A graphical user interface as recited in claim 19, wherein the non-media item data is associated with a disk mode usage of the media device.

23. A graphical user interface for providing media items for a playlist for use by a host computer and a media device, the host computer including at least a processor and a display device, and the media device having a storage capacity, said graphical user interface comprising:
a list of media items that are within the playlist, said list being displayed on the display device of the host computer;
a fill criteria control that is user-selectable and used to specify at least one user-selected fill criteria;
a selectable user interface control displayed on the display device of the host computer, said selectable user interface control, upon selection, initiates an automated filling of the playlist with selected one of the media items being chosen in accordance with the at least one user-selected fill criteria; and
a user selection control that enables a user of the host computer to reserve a portion of the storage capacity of the media device for storage of non-media item data, and
wherein the automated filling of the playlist is to a non-reserved portion of the storage capacity limit.

24. A graphical user interface as recited in claim 23, wherein a remaining portion of the storage capacity of the media device is for storage of media item data.

25. A graphical user interface as recited in claim 23, wherein said user selection control comprises:
a slider that enables the user of the host computer to control whether or not to reserve a portion of the storage capacity for storage of non-media item data.

26. A graphical user interface as recited in claim 23, wherein the non-media item data is associated with a disk mode usage of the media device.

27. A graphical user interface as recited in claim 23, wherein the playlist has a capacity limit, and
wherein the capacity limit is set to a user-specified amount that is less than the storage capacity of the media device.

28. A non-transitory computer readable medium including at least computer program code for providing media items for a media item grouping for use on a host computer and a media device, said computer readable medium comprising:
computer program code for displaying a listing of media items that are within the media item grouping on a display screen of the host computer, all of the media items being stored locally on the host computer and at least a portion of the media items being stored on the media device;
computer program code for determining a capacity limit for the media item grouping and a storage capacity for the media device;
computer program code for setting a capacity limit for the media item grouping, the capacity limit being set to an amount that is less than the storage capacity of the media device;
computer program code for comparing the current capacity for the playlist to the capacity limit for the playlist to determine available capacity for the playlist;
computer program code for receiving a user selection to initiate automatic filling of the media item grouping with additional media items; and
computer program code for automatically filling the media item grouping with additional media items to the capacity limit in response to the user selection to automatically fill the media item grouping if the current capacity is less than the capacity limit.

* * * * *

UNITED STATES PATENT AND TRADEMARK OFFICE
CERTIFICATE OF CORRECTION

PATENT NO. : 7,958,441 B2
APPLICATION NO. : 11/097591
DATED : June 7, 2011
INVENTOR(S) : Heller et al.

It is certified that error appears in the above-identified patent and that said Letters Patent is hereby corrected as shown below:

On the Title page, in Item (57), in column 2, in "Abstract", line 6, delete "know" and insert -- known --, therefor.

On page 3, in column 2, under "Other Publications", line 35, delete "Columist"," and insert -- Columnist", --, therefor.

On page 3, in column 2, under "Other Publications", line 43, delete "PalmTM™" and insert -- Palm™ --, therefor.

On page 4, in column 1, under "Other Publications", line 14, delete "414-417Apr." and insert -- 414-417, Apr. --, therefor.

On page 4, in column 1, under "Other Publications", line 7, delete "TapBase"," and insert -- TapeBase", --, therefor.

On page 4, in column 2, under "Other Publications", line 20, delete "Halfe-life," and insert -- Half-life, --, therefor.

On sheet 8 of 11, in Figure 8A, Box 814, line 1, delete "PREFRENCE(S)" and insert -- PREFERENCE(S) --, therefor.

In column 3, line 47, delete "if" and insert -- is --, therefor.

In column 9, line 6, delete "if" and insert -- is --, therefor.

Signed and Sealed this
Twenty-ninth Day of November, 2011

David J. Kappos
*Director of the United States Patent and Trademark Office*